United States Patent [19]

Cullen et al.

[11] Patent Number: 4,772,300

[45] Date of Patent: Sep. 20, 1988

[54] ADSORBENT CARTRIDGE

[75] Inventors: John S. Cullen, Buffalo; Samuel A. Incorvia, Tonawanda, both of N.Y.; Willis B. Ryon, Vincentown, N.J.

[73] Assignee: Multiform Desiccants, Inc., Buffalo, N.Y.

[21] Appl. No.: 720,362

[22] Filed: Apr. 4, 1985

[51] Int. Cl.⁴ .............................................. B01D 53/04
[52] U.S. Cl. ......................................... 55/387; 55/389; 206/0.7; 206/204; 210/282; 312/31
[58] Field of Search ............... 55/274, 384, 387–390; 206/0.5, 0.7, 204; 210/264, 266, 282–284, 287–289, 437–439, 502; 312/31, 31.1, 31.2, 31.3

[56] References Cited

U.S. PATENT DOCUMENTS

| 2,007,632 | 7/1935 | Blank et al. ........................ 312/31 |
| 2,838,795 | 6/1958 | Lockwood ..................... 55/387 X |
| 2,852,326 | 9/1958 | Westlake, Jr. ................. 55/387 X |
| 3,132,909 | 5/1964 | Josefson ........................ 312/31.1 |
| 3,170,872 | 2/1965 | Balogh et al. ................ 55/387 X |
| 3,240,567 | 3/1966 | Caparreli et al. ............. 55/387 X |
| 3,309,849 | 3/1967 | Ward ................................ 55/387 |
| 3,315,447 | 4/1967 | Meier ............................... 55/387 |
| 3,445,149 | 5/1969 | Kuypers ......................... 312/31 |
| 3,567,085 | 3/1971 | Flores .......................... 206/204 X |
| 3,722,188 | 3/1973 | Cullen ............................. 55/387 |
| 3,739,558 | 6/1973 | Hurson ........................... 55/387 |
| 3,799,352 | 3/1974 | McClive ....................... 210/282 |
| 3,820,309 | 6/1974 | Cullen et al. ................... 55/387 |
| 3,918,578 | 11/1975 | Cullen et al. ............. 312/31.1 X |
| 3,990,872 | 11/1976 | Cullen ............................. 55/274 |
| 4,116,649 | 9/1978 | Cullen et al. ................... 55/387 |
| 4,272,264 | 6/1981 | Cullen et al. ................... 55/387 |
| 4,374,571 | 2/1983 | Hirvela ....................... 206/0.5 X |
| 4,401,447 | 8/1983 | Huber ............................. 55/387 |
| 4,464,261 | 8/1984 | Cullen et al. ................. 210/282 |

FOREIGN PATENT DOCUMENTS 119418 9/1980 Japan ............................... 55/387

Primary Examiner—Robert Spitzer
Attorney, Agent, or Firm—Joseph P. Gastel

[57] ABSTRACT

An adsorbent cartridge having an elongated hollow cylindrical body member fabricated of polyethylene, polyester or polypropylene, spun-bonded polyolefin membranes closing the open ends of the body member, adsorbent within the body member, and raised splines or ribs extending longitudinally on the outer surface of the body member for causing the cartridge to have a different feel than a medicinal capsule with which it may be packaged.

17 Claims, 1 Drawing Sheet

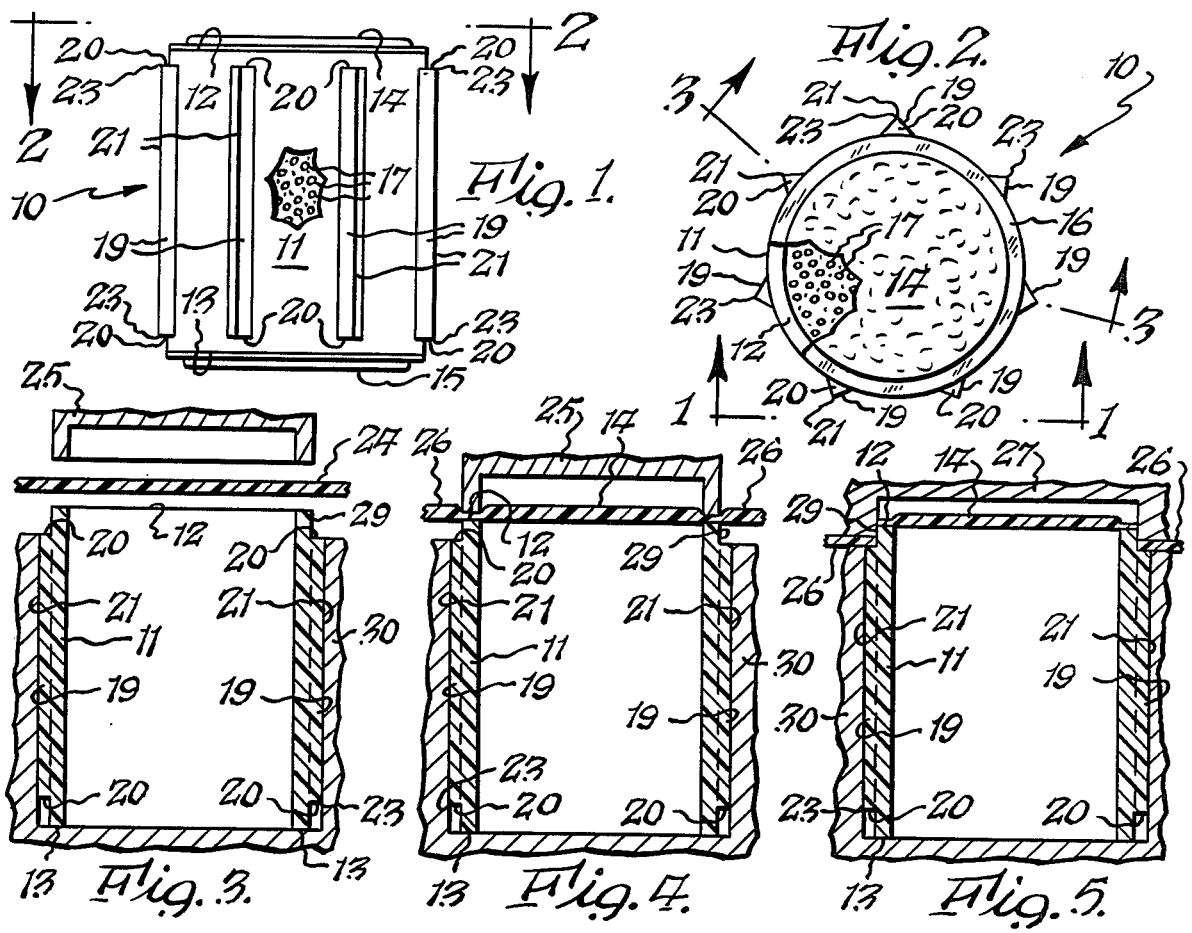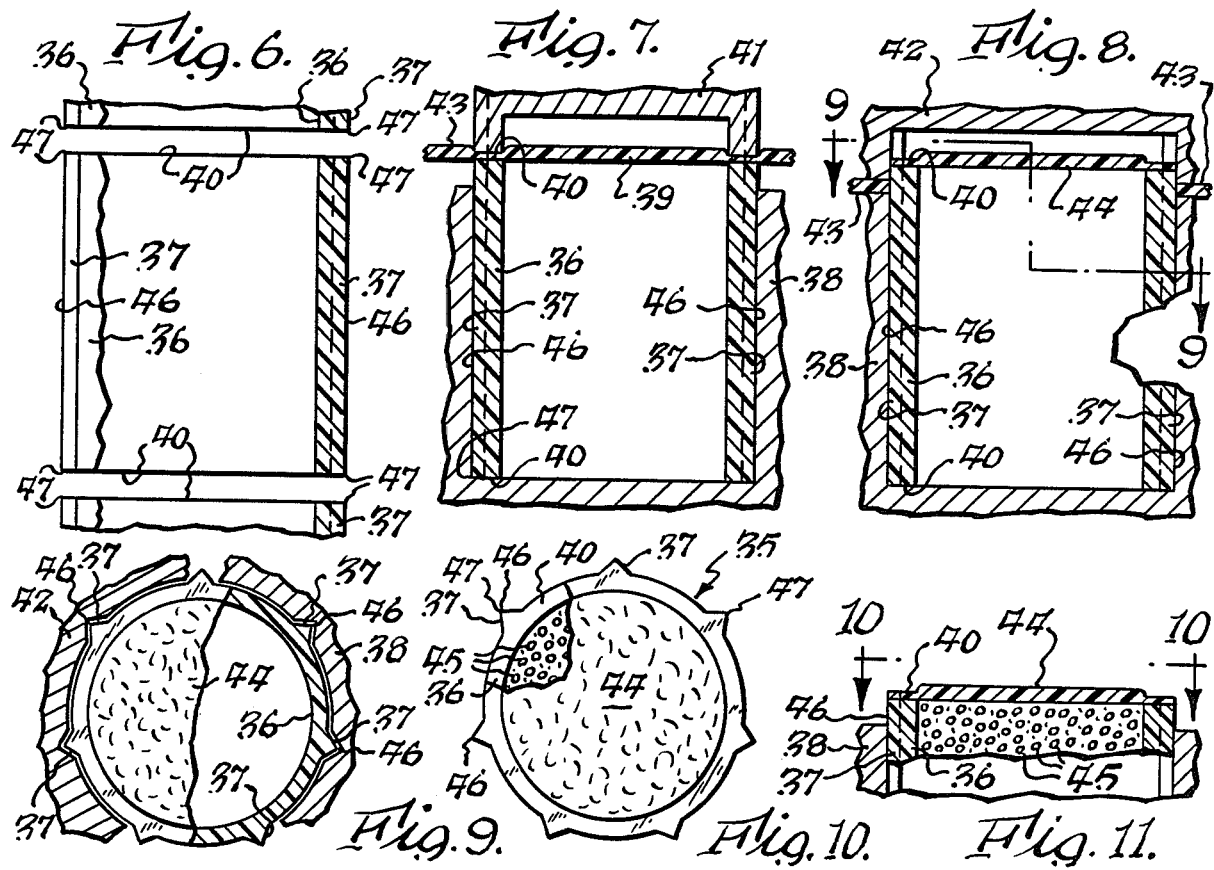

ADSORBENT CARTRIDGE

BACKGROUND OF THE INVENTION

The present invention relates to an improved adsorbent cartridge of the type which is generally placed in containers for medicinal pills or capsules to adsorb moisture, odors or other gases from the container in which they are located.

By way of background, there are currently in use small adsorbent cartridges of the type which have an impervious body portion and a perforated end cap at one or both ends which permit communication between the environment and the adsorbent within the cartridge. Whenever activated charcoal or other like substances are used which form fine dust, this dust passes through the perforations and collects on the pills or capsules adjacent thereto. While this is perfectly harmless because the activated charcoal is non-toxic, the fact remains that the blackening of the pills or capsules makes them unappetizing. In addition, in the past the small adsorbent cartridges were often mistaken for medicinal capsules with which they were packaged and were ingested by various types of people, such as those with poor vision or who were mentally feeble. It is with overcoming the foregoing deficiency of prior types of adsorbent cartridges that the present invention is concerned.

SUMMARY OF THE INVENTION

It is accordingly the object of the present invention to provide an improved adsorbent cartridge of the type used with pills, capsules and the like and which is fabricated with components which will pass moisture vapor and gases but under no circumstances will permit the adsorbent contained therein to pass into the environment in which the cartridge is located.

Another object of the present invention is to provide an improved adsorbent cartridge of the type used in containers of pills, capsules or the like which has an outer surface configuration which is so different from a medicinal capsule that it can readily be distinguished therefrom by feel.

A further object of the present invention is to provide an improved adsorbent cartridge which is not only capable of achieving the above enumerated objects but which also can be fabricated in an extremely simple and expedient manner. Other objects and attendant advantages of the present invention will readily be perceived hereafter.

The present invention relates to an adsorbent cartridge for use in a container of medicinal capsules comprising a body member having an outer surface and first and second ends, elongated ribs on said outer surface and extending lengthwise of said body member, a gas-permeable membrane closing an opening on at least one of said ends, and adsorbent within said body member.

The various aspects of the present invention will be more fully understood when the following portions of the specification are read in conjunction with the accompanying drawings wherein:

BRIEF DESCRIPTION OF THE DRAWINGS

FIG. 1 is a side elevational view taken substantially in the direction of arrows 1—1 of FIG. 2 of an improved cartridge of the present invention having splines thereon to distinguish it from medicinal capsules with which it is packed;

FIG. 2 is a top plan view, partially broken away, taken substantially in the direction of arrows 2—2 of FIG. 1;

FIG. 3 is a fragmentary cross sectional view taken substantially along line 3—3 of FIG. 2 and additionally showing the first step in attaching a permeable end to the body of the cartridge;

FIG. 4 is a view similar to FIG. 3 and showing the permeable end actually being attached to the body of the cartridge;

FIG. 5 is a fragmentary cross sectional view similar to FIG. 4 and showing the outer edges of the permeable end being trimmed;

FIG. 6 is a fragmentary side elevational view of another embodiment and showing how body portions of a cartridge may be cut to length from an extruded tube;

FIG. 7 is a fragmentary cross sectional view similar to FIG. 6 and showing the first step in attaching the permeable end to the body portion of the cartridge;

FIG. 8 is a view similar to FIG. 7 and showing the permeable end being trimmed after it has been attached;

FIG. 9 is a cross sectional view taken substantially along line 9—9 of FIG. 8 and showing the cross sectional view of the body portion of the cartridge and also showing how it is held in a fixture during the trimming operation;

FIG. 10 is a plan view, partially broken away, taken substantially in the direction of arrows 10—10 of FIG. 11 and showing the permeable end of the cartridge attached to the body; and FIG. 11 is a fragmentary cross sectional view similar to FIG. 8 but showing the permeable end of the cartridge after it has been trimmed.

DESCRIPTION OF THE PREFERRED EMBODIMENTS

The improved adsorbent cartridge 10 of the present invention includes a generally cylindrical casing 11 fabricated of rigid high density polyethylene, polyester or polypropylene. The annular ends 12 and 13 are flat (FIG. 3). Secured to ends 12 and 13 are spun-bonded polyolefin membrane discs 14 and 15, respectively. The securing may be by any form of adhesive connection and preferably by ultrasonic welding, impulse sealing, radio frequency welding, or any other suitable process.

The attachment of the membrane discs 14 and 15 by means of ultrasonic welding, impulse sealing or radio frequency welding is possible because the spun-bonded polyolefin and the high density polyethylene are compatible in that they have melting points which are reasonably close to each other so that they can fuse to provide a good seal. A characteristic of the spun-bonded polyolefin is that it becomes transparent when sealed to another body by the foregoing methods and therefore, as can be seen from FIG. 2, the sealed edge portion, such as 16 on the periphery of disc 14, is glossy while the central portion of disc 14 within annular periphery 16 retains its opaque paper-like appearance.

The cartridge 10 is filled with a suitable adsorbent 17 which will adsorb moisture, odor or gases from the surroundings into which cartridge 10 is placed. By way of example and not limitation, the adsorbent may be a substance such as Clintolite, activated charcoal, crystalline metal aluminosilicates, activated bentonite, silica gel, molecular sieve, calcium sulfate or any other suitable product or mixtures thereof.

The pore size of the spun-bonded polyolefin is such that it will pass only gases and liquid vapor but will not pass water droplets. Furthermore, it is especially significant that the pore size is so small that it will not pass carbon powder which has heretofore passed through drilled holes in end caps of prior types of cartridges.

The fabrication process generally includes the steps of securing the disc 15 to flat annular surface 13, filling the cartridge with adsorbent 17, from its open top, and thereafter securing the top disc 14 to annular surface 12 by any one of the above attachment processes.

The improved cartridge 10 of the present invention has an outer body configuration by which it can be distinguished by feel from medicinal capsules. A plurality of triangular splines or ribs 19 are formed integrally with and extend longitudinally of body portion 11. Splines 19 each have ends 20 which terminate short of ends 12 and 13 of body member 11. Thus, splines 19 not only provide sharp edges 21 at the outer edges of the triangular splines or ribs 19 but also provide sharp points 23 at the junctions of edges 21 and ends 20. Thus, it is quite apparent that the outer configuration of body portion 11 can be distinguished by feel from the purely cylindrical outer surface of a medicinal capsule which is grasped prior to ingestion.

One method of fabricating cartridge 10 is shown in FIGS. 3-5. The first step is shown in FIG. 3 wherein a sheet 24 of spun-bonded polyolefin is placed in contiguous relationship to end 12 and a die 25 is used to press the sheet 24 into engagement with edge 12 to thereby bond it by any above described methods, such as ultrasonic welding, impulse sealing, radio frequency welding, or any other suitable process. The actual sealing operation is shown in FIG. 4. Alternatively, adhesive may be used. After one end is sealed, the protruding edge portions 26 are trimmed by a circular die 27 which is forced downwardly over circular annular end portion 29 of the cartridge body 11 while the latter is held in a fixture or holder 30. Thereafter, the body member is inverted and the cartridge is filled with adsorbent 17 which may be of any suitable type described above. Thereafter, the opposite end 13 of body 11 has a permeable end 15 applied thereto and trimmed in the same manner described above relative to FIGS. 3-5.

A modified embodiment of FIGS. 3-5 is shown in FIGS. 6-11. The cartridge 35 of FIGS. 6-11 includes a body member 36 which is fabricated of rigid, high density polyethylene, polyester or polypropylene. The body member 36 is cut to size from an extruded tube, as shown in FIG. 6 and it has triangular splines or ribs 37 which extend throughout the length thereof, rather than stopping short of the ends, as in the embodiment of FIGS. 1-5. During fabrication, body portion 36 is held in a fixture or holder 38 and a sheet of spun-bonded polyolefin 39 is secured to end 40 by head 41 which produces a suitable bonding, as by ultrasonic welding, impulse sealing, radio frequency welding, or any other suitable method. While the body member 36 is held in holder 38, a die 42 (FIG. 8) is used to trim the outer edge of the spun-bonded polyolefin disc 44 to remove flashing 43 therefrom. It will be appreciated that die 42 is of a configuration so that it can provide complementary mating engagement with the end of body member 36. In other words, it must have a female configuration to mate with the outer configuration shown in FIG. 10. Preferably, holder or fixture 38 is of the same internal configuration so that it will receive body portion 36 in mating engagement. The die 42 and holder 38 are aligned, as can be visualized from FIG. 9, so that die 42 trims the outer edge of the cartridge 35 to the condition shown in FIG. 10.

After one disc 44 has suitably been sealed to body portion 36 and trimmed, as described above, it is inverted, and the body portion 36 is filled with suitable absorbent 45 as described above relative to FIGS. 1-3. Thereafter, the opposite disc 44 is secured to body member 36 in the same manner as described above to seal the adsorbent 45 therein. The outer configuration of the cartridge 35 is substantially the same as the outer configuration of cartridge 10 of FIGS. 1-5 in that it has triangular ribs or splines 37 extending longitudinally thereof. However, it differs from cartridge 10 in that the splines extend all the way to the opposite ends 40 of the cartridge 35. Each spline 37 includes an outer edge 46 and there is a point at 47 where edge 46 intersects with end 40.

It can thus be seen that the cartridges 10 and 35 have a different feel than a medicinal cartridge which is circular in cross section.

By way of dimensions, each of the above cartridges is approximately ⅝ inches long and ¼ inch in diameter.

While the ribs of the embodiments of FIGS. 1-5 and FIGS. 6-11 have been shown as triangular in cross section, it will be appreciated that they can be of any other suitable configuration which will distinguish the adsorbent cartridges by feel from medicinal capsules.

The spun-bonded polyolefin which seals the ends of the cartridges 10 and 35 is obtainable under the trademark TYVEK and one particular type contemplated for use is Grade 1059D. The TYVEK material comes in different grades, that is, different thicknesses so that the exact thickness which is used for any specific application will depend on the desired rate of adsorption. The body members, such as 11 and 36, may vary in diameter from ¼ of an inch to ½ inch or larger and they may be of any desired length from less than one inch to a few inches. The use of the spun-bonded polyolefin ends on the cartridges of the present invention is especially desirable for packaging in medicinal products to insure that there is no dusting of the adsorbent out of the cartridges.

While the above embodiments show the spun-bonded polyolefin secured to opposite ends of a cylindrical body member, it will be appreciated that the body member may be made with an integral impervious end and that the spun-bonded polyolefin, in this event, is applied only to one open end of the cartridge, and this embodiment is within the scope of certain of the claims. Furthermore, for certain uses, spun-bonded polyolefin may not be necessary, and any other suitable porous or foraminous gas permeable membrane material may be used.

While preferred embodiments of the present invention have been disclosed, it will be appreciated that it is not limited thereto but may be otherwise embodied within the scope of the following claims.

What is claimed is:

1. An adsorbent cartridge for placement in a container of pills, medicinal capsules, or the like, with which it is packaged and which can be distinguished from said pills or capsules by feel comprising a rigid plastic body member having first and second ends and an annular central body portion therebetween, an outer surface and an internal surface on said central body portion, circumferentially spaced elongated ribs extending longitudinally on said central body portion between said first and second ends and formed integrally with said central body portion and projecting radially outwardly from said outer surface of said central body portion, said central body portion being completely closed and impermeable to gases between said first and second ends, said adsorbent cartridge being distinguishable from medicinal pills or capsules by detecting the difference therebetween when said central body portion with said ribs thereon is grasped, an opening on at least one of said ends, a planar gas-permeable disc-like membrane closing said opening, and adsorbent within said central body portion of said body member and in direct contact with said internal surface thereof.

2. An adsorbent cartridge as set forth in claim 1 wherein said ribs do not extend all of the way to at least one of said first and second ends.

3. An adsorbent cartridge as set forth in claim 1 wherein said ribs do not extend all of the way to said first and second ends.

4. An adsorbent cartridge as set forth in claim 1 wherein said ribs extend all of the way to said first and second ends.

5. An adsorbent cartridge as set forth in claim 1 wherein said ribs are of triangular cross-sectional configuration, each of said ribs having sides which have first ends which merge with said outer surface and which converge outwardly away from said outer surface and which terminate at a sharp outer edge.

6. An adsorbent cartridge as set forth in claim 5 wherein said triangular ribs have end portions which include points in addition to said sharp outer edges.

7. An adsorbent cartridge as set forth in claim 1 wherein said gas permeable membrane is spun-bonded polyolefin.

8. An adsorbent cartridge as set forth in claim 1 including a second opening at the other of said ends, and a second gas-permeable membrane closing said second opening.

9. An adsorbent cartridge as set forth in claim 8 wherein said ribs are of triangular cross-sectional configuration, each of said ribs having sides which have first ends which merge with said outer surface and which converge outwardly away from said outer surface and which terminate at a sharp outer edge.

10. An adsorbent cartridge as set forth in claim 9 wherein said triangular ribs have end portions which include points in addition to said sharp outer edges.

11. An adsorbent cartridge as set forth in claim 1 wherein said body member has a longitudinal axis, and wherein elongated ribs extend substantially parallel to said longitudinal axis.

12. An adsorbent cartridge as set forth in claim 11 wherein said ribs do not extend all of the way to at least one of said first and second ends.

13. An adsorbent cartridge as set forth in claim 11 wherein said ribs do not extend all of the way to said first and second ends.

14. An adsorbent cartridge as set forth in claim 11 wherein said ribs extend all of the way to said first and second ends.

15. An adsorbent cartridge as set forth in claim 11 wherein said ribs are of triangular cross-sectional configuration, each of said ribs having sides which have first ends which merge with said outer surface and which converge outwardly away from said outer surface and which terminate at a sharp outer edge.

16. An adsorbent cartridge as set forth in claim 15 wherein said triangular ribs have end portions which include points in addition to said sharp outer edges.

17. An adsorbent cartridge for placement in a container of pills, capsules, or the like, with which it is packaged and which can be distinguished from said pills or capsules by feel comprising a rigid plastic body member having first and second ends and an annular central body portion therebetween, an outer surface and an internal surface on said central body portion, a plurality of circumferentially spaced elongated ribs extending longitudinally on said central body portion between said first and second ends and formed integrally with said central body portion and projecting radially outwardly from said outer surface of said central body portion, said central body portion being completely closed and impermeable to gases between said first and second ends, said adsorbent cartridge being distinguishable from medicinal pills or capsules by detecting the difference therebetween when said central body portion with said ribs thereon is grasped, an opening on at least one of said ends, a planar gas-permeable disc-like plastic membrane sealed by fusion across said opening for closing said opening, and adsorbent within said central body portion of said body member and in direct contact with said internal surface thereof.

* * * * *